United States Patent [19]

Powell et al.

[11] 3,969,434

[45] July 13, 1976

[54] PROCESS FOR PREPARING IONICALLY CROSSLINKED COPOLYMERS

[75] Inventors: Richard James Powell; George Wyatt Prejean, both of Orange, Tex.

[73] Assignee: E. I. Du Pont de Nemours and Company, Wilmington, Del.

[22] Filed: Oct. 29, 1973

[21] Appl. No.: 410,884

[52] U.S. Cl.......................... 260/897 B; 260/23 AR; 260/DIG. 31; 526/14; 526/47
[51] Int. Cl.$^2$.......................... C08L 23/08
[58] Field of Search..... 260/897 A, 897 B, DIG. 31, 260/78.5 T

[56] References Cited
UNITED STATES PATENTS

| | | | |
|---|---|---|---|
| 3,404,134 | 10/1968 | Rees | 260/78.5 |
| 3,437,718 | 4/1969 | Rees | 260/897 B |
| 3,649,578 | 3/1972 | Bush | 260/897 B |
| 3,819,768 | 6/1974 | Molitor | 260/897 B |

*Primary Examiner*—Carman J. Seccuro

[57] ABSTRACT

Process for ionically crosslinking first copolymers formed by copolymerizing at least one alpha-olefin of the general formula $RCH=CH_2$ where R is hydrogen or hydrocarbyl having 1 to 8 carbon atoms and at least one alpha, beta-ethylenically unsaturated carboxylic acid having 1 to 2 carboxylic acid groups and 3 to 8 carbon atoms, the alpha-olefin content of the first copolymer comprising at least 50 mole percent of the first copolymer, the alpha, beta-ethylenically unsaturated acid content of said first copolymer comprising 0.2 to 25 mole percent of the first copolymer which comprises mixing the first copolymer with a cation-supplying blend of 20 to 80 percent by weight of substantially water-insoluble zinc oxide and/or zinc hydroxide and/or zinc carbonate, 0 to 10 percent by weight of a lubricant and a complemental amount of a second copolymer with a melt index of 50 to 2000 g./10 min. formed as the first copolymer, at a pressure of 100 to 10,000 p.s.i., at a temperature above the melting point of both the first and second copolymers and between 100°C. and 330°C., with the amount of the cation-supplying blend present being that amount which has sufficient cations to neutralize at least 10 percent of the carboxylic acid groups in the first and second copolymers and neutralizing at least 10 percent of the carboxylic acid groups in the first and second copolymers, characterized in that there is present during the crosslinking reaction, 0.5 to 20 percent by weight, based on the total weight of the cation-supplying blend, of at least one zinc salt of a volatile organic acid.

10 Claims, 4 Drawing Figures

FIG. IA
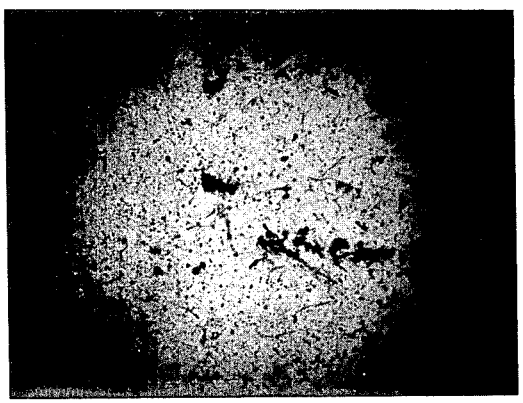
FIG. IB
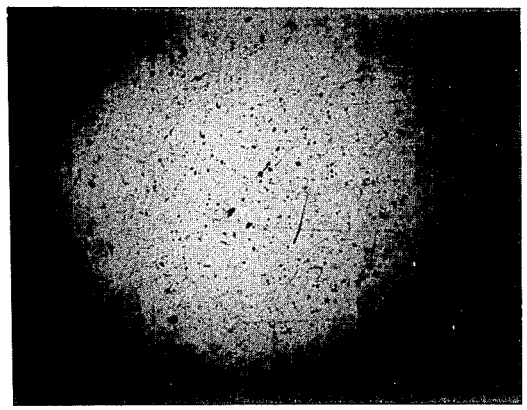
FIG. IC
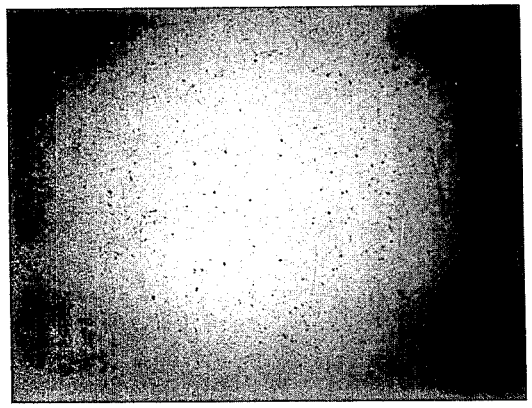
FIG. ID
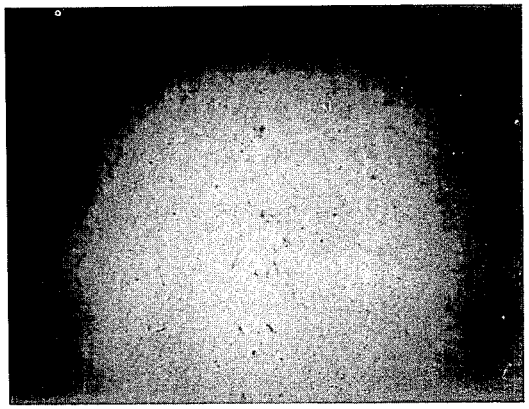

PROCESS FOR PREPARING IONICALLY CROSSLINKED COPOLYMERS

BACKGROUND OF THE INVENTION

1. Field of the Invention

This invention relates to an improved process for producing ionically crosslinked copolymers.

2. Description of the Prior Art

U.S. Pat. No. 3,404,134 discloses a process for ionically crosslinking copolymers of carboxylic acids and alpha-olefins, i.e., neutralizing some of the carboxylic acid groups with metallic cation-supplying material. If the metallic cation-supplying material is substantially insoluble under the reaction conditions, it is desirable to convert the insoluble material into a soluble one in situ to accelerate the reaction. This may be accomplished in the case of metal oxides, hydroxides and carbonates by the addition of acid such as acetic acid.

U.S. Pat. No. 3,649,578 discloses an improved method for producing ionically crosslinked copolymers. The copolymers had improved properties such as less residual water from the process; did not have obnoxious odors which were present when the water-insoluble cation-supplying material was rendered water-soluble by the use of agents such as acetic acid and did not contain white specks. While the ionically crosslinked copolymers were of good quality, as the production rate increased it was found necessary to activate the cation-supplying blend either with water or acetic acid. Frequently, even though an activator was used, unreacted metal salts such as zinc oxide could be observed in the final product.

SUMMARY OF THE INVENTION

A process has been found which produces ionically crosslinked copolymers with the above-sought after properties at increased rates of production. The process for ionically crosslinking at least one first copolymer formed by copolymerizing at least one alpha-olefin of the general formula $RCH=CH_2$ where R is a radical of the class consisting of hydrogen and hydrocarbyl radicals having 1 to 8 carbon atoms, and at least one alpha,beta-ethylenically unsaturated carboxylic acid having 1 to 2 carboxylic acid groups and 3 to 8 carbon atoms, the alpha-olefin content of said first copolymer comprising at least 50 mole percent of said first copolymer, the alpha,beta-ethylenically unsaturated carboxylic acid content of said first copolymer comprising 0.2 to 25 mole percent of said first copolymer, which comprises mixing said first copolymer with a cation-supplying blend consisting essentially of 20 to 80 percent by weight of a substantially water-insoluble zinc compound selected from the class consisting of zinc oxides, hydroxides, carbonates and mixtures thereof, 0 to 10 percent by weight of a lubricant and a complemental amount of a second copolymer with a melt index of 50 to 2000 g./10 min. formed by copolymerizing at least one alpha-olefin of the general formula $RCH=CH_2$ where R is a radical of the class consisting of hydrogen and hydrocarbyl radicals having 1 to 8 carbon atoms and at least one alpha,beta-ethylenically unsaturated carboxylic acid having 1 to 2 carboxylic acid groups and 3 to 8 carbon atoms, the alpha-olefin content of said second copolymer comprising at least 50 mole percent of said second copolymer, alpha,beta-ethylenically alpha,betaethylenically unsaturated carboxylic acid content of said second copolymer comprising 0.2 to 25 mole percent of said second copolymer, at a pressure of 100 to 10,000 p.s.i. and at a temperature above the melting point of both the first and second copolymers and between 100°C. and 330°C., with the amount of the cation-supplying blend present being that amount which has sufficient cations to neutralize at least 10 percent of the carboxylic acid groups in the first and second copolymers and neutralizing at least 10 percent of the carboxylic acid groups in the first and second copolymers, characterized in that there is present during the crosslinking reaction 0.5 to 20 percent by weight, based on the total weight of the cation-supplying blend, of at least one zinc salt of a volatile organic acid.

DESCRIPTION OF THE DRAWINGS

FIGS. 1A, 1B, 1C and 1D are photographs which illustrate the extent the number of unreacted zinc oxide particles decrease as the percent zinc acetate in the samples of Example 1 increases.

DETAILED DESCRIPTION OF THE INVENTION

"Consisting essentially of" as it is used throughout the specification and claims is meant to not exclude conditions or materials which do not prevent the advantages of the invention from being realized. "Complemental amount" as used throughout the specification and claims is not meant to detract from the aforesaid definition of "consisting essentially of."

The process of this invention can be run in different types of equipment such as in extractor-extruders and Banbury mixers. Usually the process will be carried out in an extractor-extruder. The process can optionally include the additional step of adding an activating liquid such as water to the combination of the first copolymer and the cation-supplying blend before or during mixing.

The preferred concentration of alpha-olefin polymerized units in the first and second copolymers is at least 80 mole percent and the preferred concentration of alpha,beta-ethylenically unsaturated carboxylic acid polymerized units in the first and second copolymers is 1 to 10 mole percent. The preferred melt index for the second copolymer is 100 to 1000 grams per 10 minutes while the melt index of the first copolymer is usually from 0.1 to 1000 grams per 10 minutes. Melt index, as used throughout, is measured according to ASTM-D-1238-65T. The reason for the lower limit on the melt index range for the second copolymer is that the cation-supplying blend will not have sufficient melt flow to be useful if the second copolymer used has a lower than 50 g./10 min. melt index and is partially crosslinked when the cation-supplying blend is prepared.

Specific alpha-olefin polymerized units useful in the first and second copolymers include ethylene, propylene, butene-1, styrene, pentene-1, hexene-1, heptene-1,3-methyl-butene-1, and 4-methylbutene-1. Specific alpha,beta-ethylenically unsaturated carboxylic acid polymerized units useful in the first and second copolymers include: acrylic, methacrylic, ethacrylic, itaconic, maleic, fumaric, monoesters of dicarboxylic acids such as ethyl hydrogen fumarate and maleic anhydride. Maleic anhydride and other alpha,beta-ethylenically unsaturated anhydrides are considered acids for the purposes of the present invention.

The preferred process for preparing the first and second copolymers for use in the process of this invention is copolymerization. This may be achieved by introducing the monomers into a polymerization environment maintained at high pressures 50 to 3000 atmospheres, and at elevated temperatures, 150° to 300°C., together with a free radical polymerization catalyst. An inert solvent such as water or benzene may be employed in the polymerization environment. Random distribution of carboxylic acid groups on all the polymer molecules is best obtained by direct copolymerization. Particular processes for production of the copolymers are known in the art and described in the literature.

The first and second copolymers may also be obtained by grafting an alpha,beta-ethylenically unsaturated carboxylic acid to a polyolefin base or by conversion of a copolymer of a polyolefin and a derivative of carboxylic acid to the free acid.

The cation-supplying blend is preferably 30 to 70 percent by weight of the substantially water-insoluble zinc compound, 0 to 2 percent by weight of the lubricant with the balance being the second copolymer. The substantially water-insoluble zinc compounds are zinc oxide, zinc hydroxide, zinc carbonate and mixtures thereof. The process is also useful when other substantially water-insoluble metal compounds are present, e.g., calcium oxide, calcium hydroxide, magnesium oxide, magnesium hydroxide, and mixtures of these, with their corresponding volatile organic acid salts. The normally used lubricants are stearic acid, oleic acid, erucic acid, linoleic acid, palmitic acid, and metal salts of these acids, such as zinc stearate, etc.

The cation-supplying blend can be prepared by mixing the components on a roll mill or in a Banbury mixer at a temperature above the crystalline melting point of the second copolymer. Other well-known blending techniques may also be utilized.

The presence of 0.5 to 20 percent by weight, preferably 2.0 to 8.0 percent by weight, based on the total weight of the cation-supplying blend, of at least one salt of a volatile organic acid enables an improved process for the manufacture of ionically crosslinked copolymers to be achieved. The presence of the salt of a volatile organic acid which includes zinc formate, zinc acetate, and zinc propionate eliminates the need to add acetic acid and/or water to the reaction mixture, causes less fluctuation in the polymer melt index as well as better control of extruder temperatures. The product obtained does not contain unreacted zinc oxide and there is a reduction in volatiles. Generally the salt of the volatile organic acid is added as part of a concentrate containing a water-insoluble zinc oxide compound, but other addition means are possible provided that the salt is present during the entire reaction.

The first and second copolymers need not be two-component polymers. Thus, although the olefin content of the copolymers should be at least 50 mole percent, more than one olefin can be employed to provide the hydrocarbon nature of the copolymer. Also, more than one alpha,beta-ethylenically unsaturated carboxylic acid may be employed. Additionally, any third copolymerizable monomer can be employed in combination with the olefin and the carboxylic acid comonomer. Preferred termonomers are some of the vinyl esters and acrylates such as alkyl acrylates and methacrylates having up to 8 carbon atoms; for instance, methyl methacrylate and ethyl acrylate. The scope for the first and second copolymers suitable for use in the present invention is illustrated by the following examples: ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/methyl methacrylate copolymers, ethylene/itaconic acid/methyl methacrylate copolymers, ethylene/methyl hydrogen maleate/ ethyl acrylate copolymers, ethylene/acrylic acid/vinyl alcohol copolymers, ethylene/propylene/acrylic acid copolymers, ethylene/styrene/acrylic acid copolymers, ethylene/methacrylic acid/isobutyl acrylate copolymers, ethylene/methacrylic acid/acrylonitrile copolymers, ethylene/fumaric acid/vinyl methyl ether copolymers, ethylene/vinyl chloride/acrylic acid copolymers, ethylene/ vinylidene chloride/acrylic acid copolymers, ethylene/ chlorotrifluoroethylene/methacrylic acid copolymers, ethylene/methacrylic acid/acrylic acid copolymers, and ethylene/methacrylic acid/maleic anhydride copolymers.

The copolymers may also, after polymerization, but prior to ionic crosslinking, be further modified by various reactions to result in polymer modifications which do not interfere with the crosslinking. Halogenation of the copolymer is an example.

Blends of the alpha-olefin/alpha,beta-ethylenically unsaturated carboxylic acid copolymer with other alpha-olefin/alpha,beta-ethylenically unsaturated copolymers or with other hydrocarbon polymers may be crosslinked by the process of this invention.

As used throughout the specification and claims, substantially water-insoluble zinc and metal compounds are meant to refer to such compounds which have a solubility of less than 1 gram per hundred milliliters of water at room temperature, i.e., about 20°C.

The quantity of the cation-supplying blend which is utilized will depend on the degree of crosslinking required to obtain the degree of solid property change and degree of melt property change desired. In general, it was found that the concentration of the cation-supplying blend utilized should be at least that amount which has enough cations to neutralize at least 10 percent of the carboxylic acid groups in the first and second copolymers if a significant change of properties is to be obtained. Usually, it is desirable to neutralize 10 to 90 percent of the acid groups.

The process can be run in batch form or as a continuous process. The preferred pressure for the process is 1000 to 4000 p.s.i. while the preferred temperature for the process is 200° to 300°C.

The crosslinked copolymer obtained from the process of this invention is useful in film, molding and foam for insulation.

EXAMPLES OF THE INVENTION

The following examples are to illustrate but not to limit the invention. All percentages and parts are by weight unless otherwise specified. In the examples, percent haze is measured according to ASTM-D-1003-61 Procedure A.

Infrared (IR) determination of Percent Neutralization is determined as follows: The logarithms of the ratio of the IR absorbance of carboxylate anions (1580 $cm^{-1}$) to the IR absorbance of carboxy groups (1700 $cm^{-1}$) as a function of the percent of acid groups that are neutralized in an ethylene/methacrylic acid copolymer were determined. The percent neutralization values corresponding to a given ratio were determined by standard titration methods.

EXAMPLE 1

A dry blend of pellets of ethylene/methacrylic acid copolymer and pellets of the cation-supplying blend defined in Table I in the amount defined in Table I was fed to the feed opening of a 2-inch plasticating extruder (L/D = 21/1) at a throughput of 20 lbs./hour. The extruder temperatures were as follows:

| | |
|---|---|
| feed section | = 120°C. |
| compression section | = 170°C. |
| metering section | = 190°C. |
| die | = 200°C. |

The polymer was extruded as strands, cooled in water and pelletized.

FIGS. 1A to 1D show photographs taken of 70-mil plaques prepared from samples 1-4. This demonstrates how the number of unreacted zinc oxide particles decreased as percent zinc acetate in the concentrate increased.

TABLE I

| Sample | Methacrylic Acid Copolymer Wt. % Acid | Methacrylic Acid Copolymer MI g./10 min. | Zinc Oxide Concentrate Composition | Cation-supplying Blend, Wt. Percent Used | Product[2] No. of Particles/in.[2] (70-mil plaques) | Product[2] Haze, % (70-mil Plaques) | Percent Neutralization (by IR) |
|---|---|---|---|---|---|---|---|
| 1 | 11 | 100 | 45% ZnO<br>0.6% Zn Stearate<br>54.4% E/MAA[1] | 3.56 | 190 | 50 | 17 |
| 2 | 11 | 100 | 42.5% ZnO<br>0.6% Zn Stearate<br>2.5% Zn Acetate<br>54.4% E/MAA[1] | 3.66 | 100 | 37 | 25 |
| 3 | 11 | 100 | 40% ZnO<br>0.6% Zn Stearate<br>5% Zn Acetate<br>54.5% E/MAA[1] | 3.8 | 60 | 30 | 28 |
| 4 | 11 | 100 | 37.5% ZnO<br>0.6% Zn Stearate<br>7.5% Zn Acetate<br>54.4% E/MAA[1] | 3.93 | 25 | 25 | 24 |

[1]E/MAA - 90/10 Ethylene/methacrylic acid copolymer of 500 melt index.
[2]MI of products are not reported since they are not meaningful due to the plasticizing effect of water of reaction.
[3]Theoretical neutralization upon complete reaction = 31%. (IR is not accurate enough to discriminate between concentrates with different levels of Zn Acetate)

Complete reaction of the ZnO and Zn acetate with the acid groups of the polymer was prevented. This was accomplished by using a short mixing section (L/D = ca. 4), a short hold-up time (ca. 2 minutes) and by not extracting the reaction products (acetic acid and water). This permitted comparison of the degree of activity obtained with each sample. The specific operating details and results are shown in Table I. The preferred method of discriminating between reactivity of the different concentrates proved to be visual observation.

EXAMPLE 2

The process of Example 1 was repeated except that zinc formate was used in place of zinc acetate to catalyze the neutralization reaction.

The specific operating details and results are shown in Table II. From visual observation the activity of the concentrates was determined. The number of unreacted zinc oxide particles in 70-mil plaques of samples 1 to 3 decreased in a manner similar to activation with zinc acetate as shown in FIGS. 1A to 1D.

TABLE II

| Sample | Methacrylic Acid Copolymer Wt. % Acid | Methacrylic Acid Copolymer MI g./10 min. | Zinc Oxide Concentrate Composition | Cation-supplying Blend, Wt. Percent Used | Percent[3] Neutralization (by IR) | Product[2] Remarks |
|---|---|---|---|---|---|---|
| 1 | 11 | 100 | 42.5% ZnO<br>0.6% Zn Stearate<br>2.5% Zn formate<br>54.4% E/MAA[1] | 3.64 | 23 | Some small white particles (less than amount in Example 1, sample 1 which contains no zinc formate or acetate) |
| 2 | 11 | 100 | 40% ZnO<br>0.6% Zn Stearate<br>5% Zn formate<br>54.4% E/MAA[1] | 3.75 | 21 | A few small white particles, less than Sample 1 above. |
| 3 | 11 | 100 | 37.5% ZnO<br>0.6% Zn Stearate<br>7.5% Zn formate<br>54.4% E/MAA[1] | 3.34 | 21 | Very few small white particles, less than Sample 2 above. |

[1]E/MAA - 90/10 Ethylene/methacrylic acid copolymer of 500 melt index.
[2]MI of products are not reported since they are not meaningful due to plasticizing effect of water of reaction.
[3]Theoretical neutralization upon complete reaction = 31%. (IR is not accurate enough to discriminate between concentrates with different levels of zinc formate)

EXAMPLE 3

To the feed opening of a 3.5-inch plasticating extruder was fed a dry blend of pellets of ethylene/ methacrylic acid/isobutyl acrylate terpolymer and pellets of the cation-supplying blend defined in Table III in the amount defined in Table III. The feed rate of the blend was 70 lbs./hr. In the extruder, the plastic pellets were melted and conveyed along with the cation-supplying blend to the mixing section. The initial plasticating section of the screw was 7-diameters long and maintained at a temperature of about 120°C. At the inlet of the mxing section an activating liquid (optional) was injected into the molten stock by means of a nozzle penetrating the barrel wall. The mixing section was of the type described in U.S. Pat. No. 3,006,029 and was 13-diameters long. In the mixing section maintained at a temperature of 240° to 280°C., the cation-supplying blend reacted with the polymer melt to neutralize the acid groups of the polymer through the formation of a soluble salt.

At the end of the mixing section, the mixture of ion crosslinked terpolymr and reaction by-products passed through a pressure control valve and a transfer line into a 2-inch diameter extraction extruder. The stock temperature before the valve was ca. 265°C. and the pressure 1400 p.s.i. This extruder had two extraction zones, each about 4-diameters in length, in series. The first extraction zone was maintained at 27 in. of Hg and the second at 28 in. Hg. The temperature of the melt was maintained between 250° and 260°C. The extraction zone removed the volatile constituents from the molten, ion crosslinked terpolymer. The polymer was extruded through a die in the form of strands, cooled in water and cut into pellets. The specific details and results are shown in Table III.

copolymer and pellets of the cation-supplying blend defined in Table IV in the amount defined in Table IV. The initial plasticating section of the screw was 7-diameters long and maintained at a temperature of about 120°C. At the inlet of the mixing section an activating liquid (optional) was injected into the molten stock by means of an injection ring. The mixing section was of the type described in U.S. Pat. No. 3,006,029 and was 13-diameters long. In the mixing section maintained at a temperature of 240° to 280°C., the cation-supplying blend reacted with the polymer melt to neutralize the acid groups of the polymer through the formation of a soluble salt.

At the end of the mixing section, the mixture of ion crosslinked copolymer and reaction by-products passed through a pressure control valve and a transfer line into an extraction extruder. The stock temperature before the valve was ca. 265°C. and the pressure 1500 p.s.i. This extruder had two extraction zones, each about 4-diameters in length, in series. The first extraction zone was maintained at 27 in. of Hg and the second at 28 in. Hg. The temperature of the melt was maintained between 250° and 260°C. The extraction zone removed the volatile constituents from the molten, ion crosslinked copolymer. The polymer was extruded through a die to a melt cutter cavity where it was pelletized. The specific details and results are shown in Table IV.

TABLE III

| Sample | E/MAA/IBA Terpolymer Wt. % Acid | Wt.% Ester | MI g./10 min. | Zinc Oxide Concentrate Cation-supplying Blend, Wt. Percent Used | Composition | Solubilizing Agent Type | Amount (% Based on Polymer) | Product MI g./10 min. | Remarks |
|---|---|---|---|---|---|---|---|---|---|
| 1 | 5.8 | 18 | 35 | 45% ZnO 0.6% Zn Stearate 54.4% E/MAA[1] | 5.1 | None | — | 3.52 | Product white from unreacted ZnO |
| 2 | 5.8 | 18 | 35 | 45% ZnO 0.6% Zn Stearate 54.4% E/MAA[1] | 5.1 | HOAC[2] | 0.75[3] | — | Product clear |
| 3 | 5.8 | 18 | 35 | 42% ZnO 3% Zn Acetate 0.6% Zn Stearate 54.4% E/MAA[1] | 5.25 | H$_2$O | 0.56[4] | 2.20 | Product clear |
| 4 | 5.8 | 18 | 35 | 42% ZnO 3% Zn formate 0.6% Zn Stearate 54.4% E/MAA[1] | 5.23 | None | (5) | 2.25 | Product clear |

[1]E/MAA - 90/10 Ethylene/methacrylic acid copolymer of 500 melt index.
[2]40% aqueous solution.
[3]Minimum amount required to obtain clear melt; 0.75% is equivalent to 3000 ppm HOAC (plus 4500 ppm H$_2$O).
[4]1033 ppm HOAC generated from the zinc acetate (34% of amount added in Sample 2 above).
[5]935 ppm formic acid generated from zinc formate.

EXAMPLE 4

To the feed opening of a plasticating extruder was fed a dry blend of pellets of ethylene/ methacrylic acid

TABLE IV

| Sample | Methacrylic Acid Copolymer Wt. % Acid | MI g./10 min. | Zinc Oxide Concentrate Cation-supplying Blend, Wt. Percent Used | Composition | Solubilizing Agent Type | Amount (% Based on Polymer) | Product MI g./10 min. | Remarks |
|---|---|---|---|---|---|---|---|---|
| 1 | 10 | 35 | 45% ZnO 0.6% Zn Stearate 54.4% E/MAA[1] | 7.5 | None | — | 1.5 | Product white from unreacted ZnO |
| 2 | 10 | 35 | 45% ZnO 0.6% Zn Stearate 54.4% E/MAA[1] | 7.5 | HOAC[2] | 3 | 1.1 | Product clear |
| 3 | 10 | 35 | 42% ZnO 3% Zn Acetate 0.6% Zn Stearate | 7.8 | None | (3) | 1.1 | Product clear |

TABLE IV-continued

| Sample | Methacrylic Acid Copolymer Wt. % Acid | Methacrylic Acid Copolymer MI g./10 min. | Zinc Oxide Concentrate Composition | Zinc Oxide Concentrate Cation-supplying Blend, Wt. Percent Used | Solubilizing Agent Type | Solubilizing Agent Amount (% Based on Polymer) | Product MI g./10 min. | Product Remarks |
|---|---|---|---|---|---|---|---|---|
| | | | 54.4% E/MAA[1] | | | | | |

[1] E/MAA – 90/10 Ethylene/methacrylic acid copolymer of 500 melt index.
[2] 30% aqueous solution, amount is minimum required to insure clear product.
[3] Amount of HOAC generated = 17% of amount added in Sample 2 above.

I claim:

1. A process for ionically crosslinking at least one first copolymer formed by copolymerizing at least one alpha-olefin of the general formula $RCH=CH_2$ where R is a radical of the class consisting of hydrogen and hydrocarbyl radicals having 1 to 8 carbon atoms and at least one alpha,beta-ethylenically unsaturated carboxylic acid having 1 to 2 carboxylic acid groups and 3 to 8 carbon atoms, the alpha-olefin content of said first copolymer comprising at least 50 mole percent of said first copolymer, the alpha-beta-ethylenically unsaturated carboxylic acid content of said first copolymer comprising 0.2 to 25 mole percent of said first copolymer, which comprises mixing said first copolymer with a cation-supplying blend consisting essentially of 20 to 80 percent by weight of a substantially water-insoluble zinc compound selected from the class consisting of zinc oxide, hydroxide, carbonate and mixtures thereof, 0 to 10 percent by weight of a lubricant and a complemental amount of a second copolymer with a melt index of 50 to 2000 g./10 min. formed by copolymerizing at least one alpha-olefin of the general formula $RCH=CH_2$ where R is a radical of the class consisting of hydrogen and hydrocarbyl radicals having 1 to 8 carbon atoms and at least one alpha,beta-ethylenically unsaturated carboxylic acid, having 1 to 2 carboxylic acid groups and 3 to 8 carbon atoms, the alpha-olefin content of said second copolymer comprising at least 50 mole percent of said second copolymer, the alpha,-beta-ethyleincally unsaturated carboxylic acid content of said second copolymer comprising from 0.2 to 25 mole percent of said second copolymer, at a pressure of 100 to 10,000 p.s.i. and at a temperature above the melting point of both the first and second copolymers and between 100°C. and 330°C., with the amount of the cation-supplying blend present being that amount which has sufficient cations to neutralize at least 10 percent of the carboxylic acid groups in the first and second copolymers and neutralizing at least 10 percent of the carboxylic acid groups in the first and second copolymers, characterized in that there is present during the crosslinking reaction 0.5 to 8 percent by weight, based on the total weight of the cation-supplying blend, of at least one zinc salt of a volatile organic acid.

2. The process of claim 1 wherein the zinc salt of a volatile organic acid is selected from the class consisting of zinc formate, zinc acetate and zinc propionate.

3. The process of claim 2 wherein the zinc salt of a volatile organic acid is zinc formate.

4. The process of claim 2 wherein the zinc salt of a volatile organic acid is zinc acetate.

5. The process of claim 2 wherein the substantially water-insoluble zinc compound is zinc oxide.

6. The process of claim 2 wherein the lubricant is selected from the class consisting of stearic acid, oleic acid, erucic acid, linoleic acid, palmitic acid, and metal salts thereof.

7. The process of claim 2 wherein the cation-supplying blend contains 30 to 70 percent by weight of the substantially water-insoluble zinc compound, 0 to 2 percent by weight of lubricant, and a complemental amount of the second copolymer.

8. The process of claim 7 wherein 10 to 90 percent of the carboxylic acid of the first and second copolymers are neutralized.

9. The process of claim 8 wherein the alpha-olefin content of the first and second copolymers is at least 80 mole percent and wherein the alpha,beta-ethylenically unsaturated carboxylic acid content of the first and second copolymers is 1 to 10 mole percent.

10. The process of claim 9 wherein the pressure is 1000 to 4000 p.s.i. and the temperature is 200° to 300°C.

* * * * *